United States Patent [19]

Boehm et al.

[11] Patent Number: 4,641,568
[45] Date of Patent: Feb. 10, 1987

[54] VACUUM-OPERATED BRAKE POWER BOOSTER

[75] Inventors: Peter Boehm, Frankfurt am Main; Peter Volz, Darmstadt; Gilbert Bischoff, Hattersheim; Sigmund Booten, Oberursel; Klaus Engert, Buerstadt; Albin Loew, Karben, all of Fed. Rep. of Germany

[73] Assignee: Alfred Teves GmbH, Frankfurt am Main, Fed. Rep. of Germany

[21] Appl. No.: 710,926

[22] Filed: Mar. 12, 1985

[30] Foreign Application Priority Data

Mar. 24, 1984 [DE] Fed. Rep. of Germany ....... 3411027

[51] Int. Cl.⁴ .............................................. F15B 9/10
[52] U.S. Cl. ................... 91/369 A; 91/376 R
[58] Field of Search ............. 91/369 A, 369 B, 369 C, 91/369 R, 376 R; 181/256, 209; 92/85 R, 98 D, 99

[56] References Cited

U.S. PATENT DOCUMENTS

| | | | |
|---|---|---|---|
| 2,107,812 | 2/1938 | Berry et al. | 181/211 X |
| 2,678,637 | 5/1954 | Doeden | 181/256 X |
| 3,945,401 | 6/1976 | Greenwood | 137/627.5 |
| 4,022,112 | 5/1977 | Putt et al. | 91/376 R |

FOREIGN PATENT DOCUMENTS

| | | |
|---|---|---|
| 2038385 | 2/1971 | Fed. Rep. of Germany . |
| 2365903 | 4/1976 | Fed. Rep. of Germany . |
| 2918734 | 11/1980 | Fed. Rep. of Germany . |
| 3031224 | 3/1982 | Fed. Rep. of Germany . |
| 2082276 | 3/1982 | United Kingdom ............. 91/369 A |

Primary Examiner—Robert E. Garrett
Assistant Examiner—Mark A. Williamson
Attorney, Agent, or Firm—James B. Raden; Donald J. Breh

[57] ABSTRACT

A vacuum-operated brake power booster is provided having a movable wall which is sealed off relative to the vacuum housing and a control valve body which is slidable jointly with the movable wall. A hollow cylinder-shaped expanded plastic ring is arranged in the annular clearance between the neck portion of the pedal side housing shell and the collar of the diaphragm, which collar sealingly surrounds the control valve body. The expanded plastic ring effects the air flow during brake operation such that the air flow, enters the annular clearance through the duct extending in a radial direction within the control valve body and is suitably deflected and cushioned so that no noises arise at this point. In the same manner and simultaneously, vibrations, especially those of the neck portion of the housing shell of the vacuum housing, are suppressed, since the expanded plastic ring adheres to the inside wall of the housing shell.

9 Claims, 10 Drawing Figures

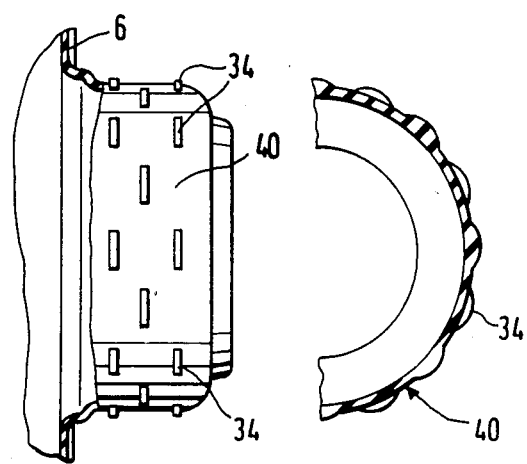
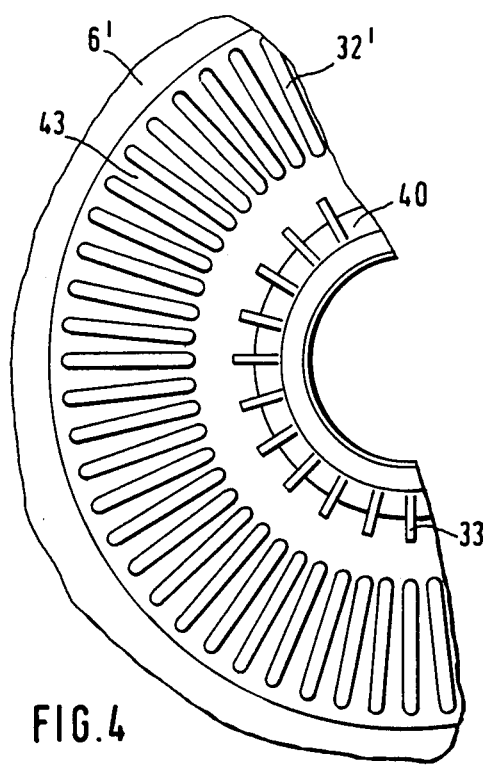
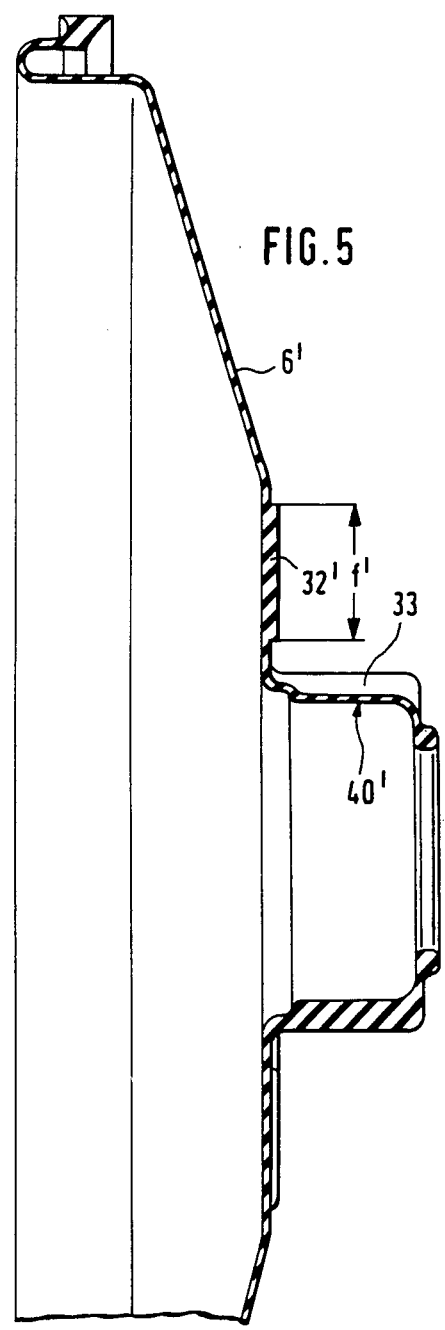

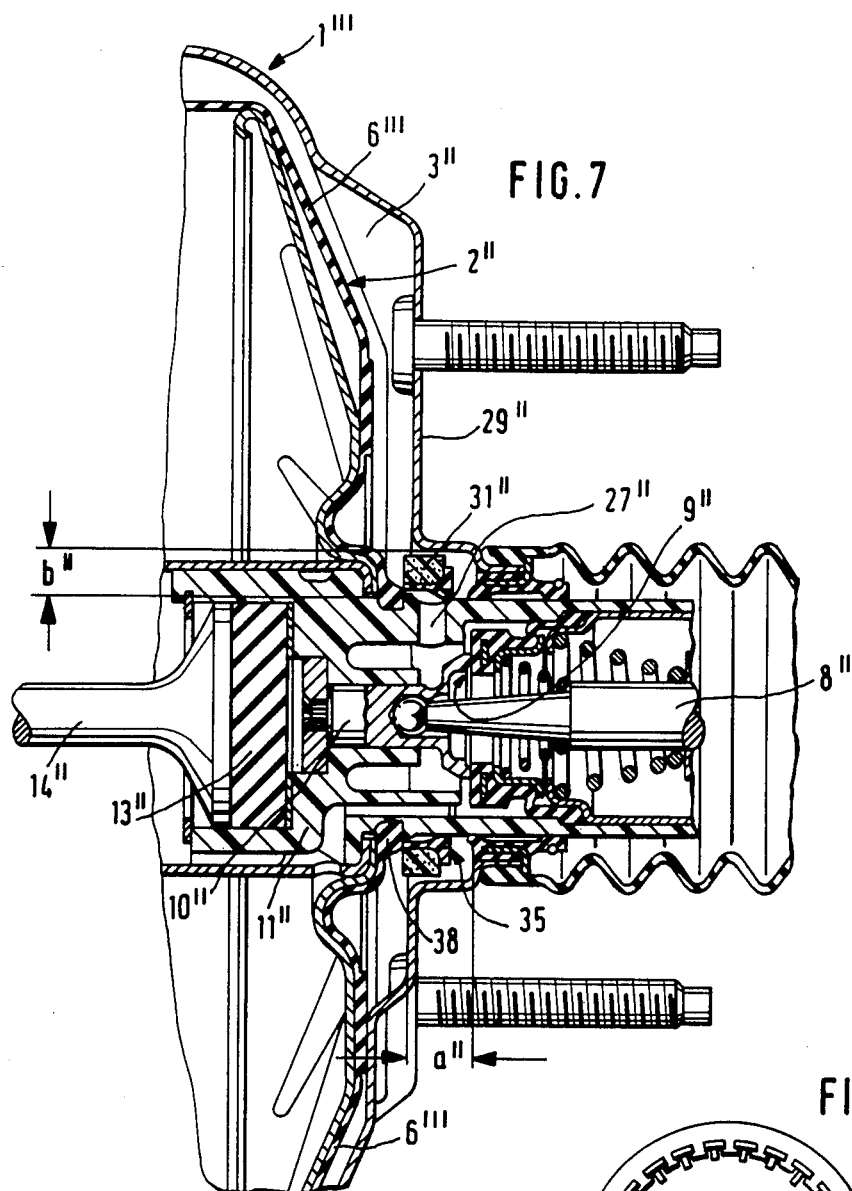
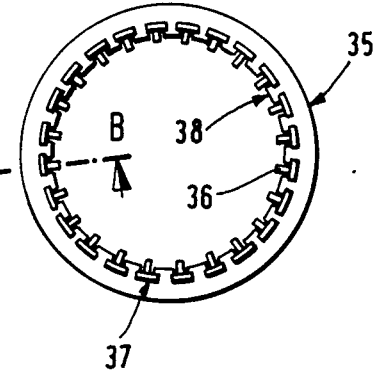
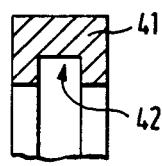
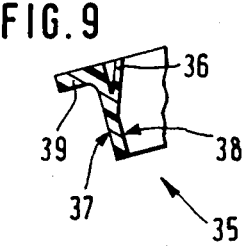
FIG.7
FIG.8
FIG.9
FIG.10

VACUUM-OPERATED BRAKE POWER BOOSTER

BACKGROUND OF THE INVENTION

The present invention is related to a vacuum-operated brake power booster with a movable wall sealed off relative to the vacuum housing. A piston rod coupled with a brake pedal serves to actuate a control valve by means of which a power chamber of the brake power booster is connectible at option either to vacuum or to a more elevated differential pressure. The control valve is furnished with a control valve piston adapted to slide axially within a control valve body. The control valve piston acts on one end of a push-rod to slide the piston of a master cylinder, with a reaction element interposed between the control valve piston and the push-rod.

There is a desire to reduce the weight and overall length of modern power brake units. However, accomplishing these two goals usually involves facing the following diadvantages: the lower weight materials such as aluminum utilized for the booster provide a poorer degree of silencing of the suction noise of the power brake unit, and due to the reduced overall length, the ventilation ducts for the power chamber are located deep within the cylindrical neck portion of the vacuum housing. The air flows at high velocity against vibrations are irradiated over the whole surface of the housing, thereby causing an annoying suction noise.

The present invention has an object to provide a vacuum-operated brake power booster having a decreased development of noise by the booster during brake operation.

SUMMARY OF THE INVENTION

According to the invention, there is a arranged an air deflector element affecting the flow of air in the annular clearance between a peripheral surface of the control valve body or a diaphragm surrounding the control valve body or a sleeve or flange portion encircling the control valve body, on the one hand, and the neck portion of the vacuum housing, on the other hand.

In this configuration, the air deflector element is preferably retained unslidably on the control valve body or on the flange portion or on the diaphragm and so moves jointly with the movable wall in the longitudinal direction of the vacuum-operated brake power booster during operation of the brake. In a preferred embodiment, a clamping ring which surrounds the control valve body is provided in order to obtain a firm seating of the air deflector element on the control valve body. Expendiently, the clamping ring is furnished for that purpose with a plurality of ribs or tabs on its radially inward annular surface, which ribs or tabs extend radially inwardly and serve to anchor the clamping ring on the outer surface of the control valve body. The clamping ring is provided at its end facing the brake pedal with a radially outwardly extending flange or rim which prevents the ring of expanded plastic material which is slipped over the clamping ring from shifting in an axial direction.

In another embodiment, the diaphragm sealing off the dished diaphragm retainer of the movable wall is provided with a collar sealingly surrounding the control valve body, which collar presents cams, nubs or ribs at its radially external envelope which extend substantially through the annular clearance approximately up to the radially inside wall surface of the shell of the vacuum housing. In an integrated version of the air deflector element, the radially outwardly extending circular disc-shaped sector of the diaphragm sealing off the dished diaphragm retainer is, advantageously, furnished with a plurality of ribs extending more or less radially outwardly and being uniformly distributed over the circumference, which ribs in conjunction with the inner wall of the shell of the vacuum housing form radial ducts that permit the air to flow through them from the annular clearance into the power chamber.

In case the air deflector element is designed as a ring of expanded plastic material, the diaphragm sealing off the dished diaphragm retainer of the movable wall is expediently formed with a collar sealingly surrounding the control valve body and exhibiting a plurality of scattered, radially extending nubs by which the expanded plastic ring is secured.

In another embodiment, the air deflector element is formed from ceramic material and is substantially ring-shaped, with at least one circular groove being provided in its cylindrical inner surface to facilitate the flow of air through the annular body and take care of damping of vibrations. Beyond this, an especially advantageous anchoring of the air deflector element on the control valve body is rendered possible in that the air deflector element is configured as a hollow cylinder having a substantially rectangular cross-section and in that it has a radially inwardly extending rib running all around on its cylindrical inner surface, which rib engages in a depression or groove on the peripheral surface of the control valve body and secures the air deflector element against shifting in an axial direction.

BRIEF DESCRIPTION OF THE DRAWINGS

In the drawings:

FIG. 2 is a partial view of the diaphragm of FIG. 1 with the expanded plastic ring removed;

FIG. 3 is a partial view of the diaphragm of FIG. 1 with the expanded plastic ring removed;

FIG. 4 is a partial top view of a diaphragm in which the air deflector element is configured in the shape of a ribbed body applied on the collar of the diaphragm;

FIG. 5 is a partial cross-section of a diaphragm of FIG. 4;

FIG. 7 is a longitudinal partial cross-section through a further embodiment of a brake power booster in which the air deflector element in the shape of a hollow cylinder-type expanded plastic ring is retained in the annular clearance between the control valve body and the neck portion of the vacuum housing by means of a clamping ring;

FIG. 8 is a top plan view of the clamping ring of FIG. 7;

FIG. 9 is a partial cross-section of the clamping ring of FIG. 7, and

FIG. 10 is a partial cross-section through an air deflector element in the shape of a hollow cylinder-type ring of a porous ceramic material.

DESCRIPTION OF THE PREFERRED EMBODIMENTS

Figure 1:
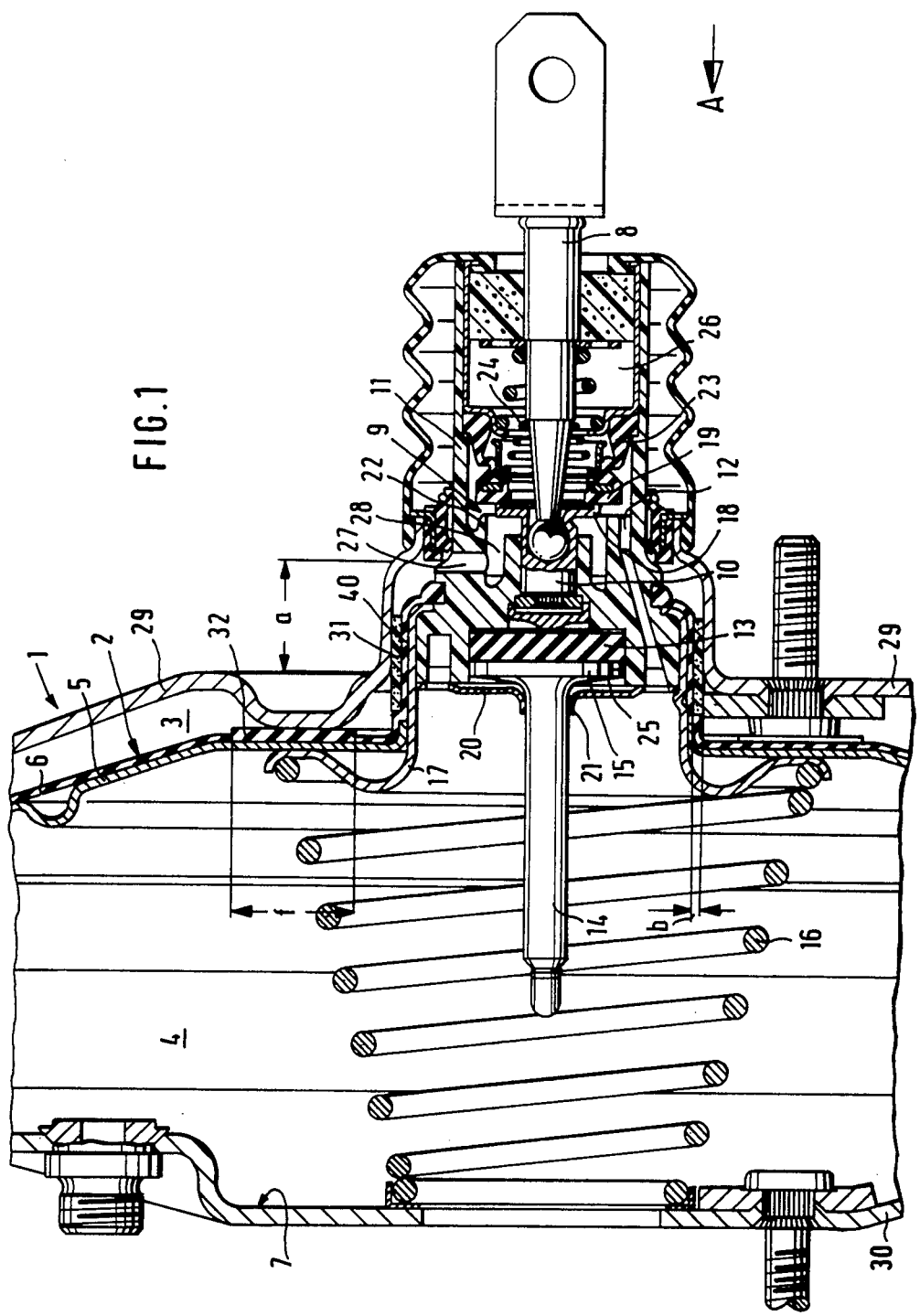
FIG. 1 is a longitudinal partial cross-section through a vacuum-operated brake power booster in which a hollow cylinder-shaped air deflector element constituted by an expanded plastic ring is slipped on the rolling diaphragm.

The brake power booster according to FIG. 1 comprises a vacuum housing 1 which is subdivided into a power chamber 3 and a vacuum chamber 4 by means of an axially movable wall 2. The said axially movable wall 2 is comprised of a dished diaphragm retainer 5 which is deep-drawn from sheet or plate metal and of a flexible diaphragm 6 adhering to it and forming a rolling diaphragm as a seal between the circumference of the dished diaphragm retainer 5 and the vacuum housing 1 in a way not shown in detail in the drawing.

A control valve 9 which is actuable by a piston rod 8 is comprised of a control valve piston 10 connected to the piston rod 8 which clears valve openings in a control valve body 11 in a manner that in the illustrated non-actuated position, the power chamber 3 is put into communication with the vacuum chamber 4 through air guide ducts 12 running laterally within the control valve body 11 and ending up on the frontal side at the periphery of the control valve body 11. In the event of actuation of the control valve 9, that is when the piston rod 8 performs an axial movement, the communication between the vacuum chamber 4 and the power chamber 3 is interrupted. The power chamber 3 is then connected to the atmosphere, so that the movable wall 2 moves in the direction of the vacuum chamber 4.

The brake power is transmitted through a rubber-elastic reaction disc 13 received in a front side depression of the control valve body 11 and through a push-rod 14 furnished with a head flange 15 to an actuating piston of a master cylinder (not shown in the drawing) of the braking system which is located at the vacuum side end of the brake power booster.

A compression spring 16 which takes support at the one front wall 7 of the vacuum housing 1 and at a flange 17, retains the movable wall 2 in the starting position illustrated in the drawing.

A guide disk 20 made of metal sheet or plate is fixed at the control valve body 11. The guide disk 20 prevents the push-rod 14 from falling out or breaking off when the master cylinder is being unmounted, and the funnel-shaped portion 21 of the guide disk 20 secures the head flange 15 of the push-rod 14 in the recess 25 of the control valve body 11.

When the brake pedal is operated, the piston rod 8 with the valve piston 10 is slid to the left against the force of the spring 24. During this procedure, the spring 24 of the poppet valve 23 urges the latter to the left onto the seat 22 in the control element housing 11, and the air guide duct 12 is closed. As the motion proceeds, the valve piston 10 travels away from the poppet valve 23, and the passage of atmospheric air is so opened. The atmospheric air now finds its way free to flow through the control passage 26 in the control element housing 11 to the right side of the valve piston 10, as a result whereof the vacuum in the power chamber 3 is relieved. The force originating from the pressure difference now coming to exist between the right and the left side of the movable wall 2 shifts the valve piston 10 to the left against the force of the compression spring 16, and also shifts to the left the push-rod 14 and the piston in the master cylinder. The pressure building up in the master cylinder due to the primary cup when the compensating port has been passed beyond of brings a force of reaction to bear on the reaction disk 13 through the master cylinder piston and the push-rod 19, that force of reaction being porportional to the reduction ratio. The reaction pressure is transmitted also to the valve piston 10, as a result whereof the latter is shifted to the right and with its seat 18 comes to be sealingly seated on the poppet valve 23. The air guide duct 12 and the atmosphere port 26 so come to be closed up. The valve piston 10 has herewith assumed its so-called standby position.

In the event of full braking, the passage of atmospheric air is opened steadily, whereby the maximum attainable pressure difference at the movable wall 2 and, in consequence, the maximum supporting pressure are brought about. At this point, the maximum control pressure of the unit is reached. From now on, a still higher pressure in the master cylinder can be obtained by additional force exerted on the piston rod 8 through pedal effort on the part of the driver. Upon the complete return of the brake pedal, the valve piston 10 travels back into its starting position, the atmosphere port 26 so being closed and the vacuum ports 12, 27, 28 steadily opened. In consequence of the vacuum balance which forcibly reacts in this way at the movable wall 2, no force is any longer exerted on the valve piston 10, and the restoring force of the spring 16 is sufficient to being the valve piston 10 back into its release position. As a consequence, the piston of the master cylinder travels back into its release position.

As is evident from FIG. 1, the control element housing 11 is furnished with a duct 27 extending transversely relative to the longitudinal axis of the unit. Duct 27 links the valve space 28 behind the control valve 9 with the power chamber 3 through which duct 27 atmospheric air flows when the brake pedal is operated. In that instance, the inflow of atmospheric air into the power chamber 3 takes place very quickly with elevated flow velocities coming about, in particular within the range of the neck portion "a" of the housing shell 29 guiding the control valve body 11. Since, on one hand, the external diameter of the neck portion "a" cannot, as a rule, be selected of any desired size, while, on the other hand, the dimensions of the control valve body 11 cannot be reduced, the rubber diaphragm 6 is furnished, in the range of the neck portion "a", with a ring 31 of porous expanded plastic. Ring 31 fills in the annular clearance "b" between the cylindrical inner wall of the housing shell 29 in the range of the neck portion "a" and the cylindrical peripheral surface of the corresponding portion of the rubber diaphragm 6. The expanded plastic ring 31 has a cushioning effect on the atmospheric air flowing at high speed into the power chamber 3, since the air is forced to disperse in front of the expanded plastic ring 31 in order to flow through it at reduced velocity. In addition to that, any potential vibrations of the housing shell 29 and/or of the control valve body 11 are damped because the expanded plastic ring 31 adheres to these elements with a certain amount of radial tension. In the range of a circular disc-shaped sector "f", the diaphragm 6 is formed with ribs 32 extending in radial direction so as to insure that the velocity of the air flow is not reduced further on its way from the expanded plastic ring 31 into the power chamber 3 when the diaphragm 6 adheres to the inside surface of the housing shell 29, which is the release position of the brake. Moreover, it is ensured by said ribs 32 that the diaphragm 6 does not firmly stick to the inside surface of the housing shell 29.

As is shown in FIGS. 2 and 3, the diaphragm 6 is furnished with a plurality of radially outwardly extending nubs 34 in the range of the neck portion "a", said nubs 34 being uniformly distributed in a scattered pattern and suitably shaped so that the expanded plastic ring 31 can be firmly secured onto them.

The diaphragm 6' illustrated in FIGS. 4 and 5 is distinguished from that shown in FIGS. 1 to 3 by a plurality of radially outwardly extending wings or ribs 33 which are suitably configured to adhere to the inside wall of the housing shell 29 in the range of the neck portion "a" and which have, for the rest, the same effect like the expanded plastic ring 31 provided in that same location in the embodiment according to FIGS. 1 to 3.

Figure 6:
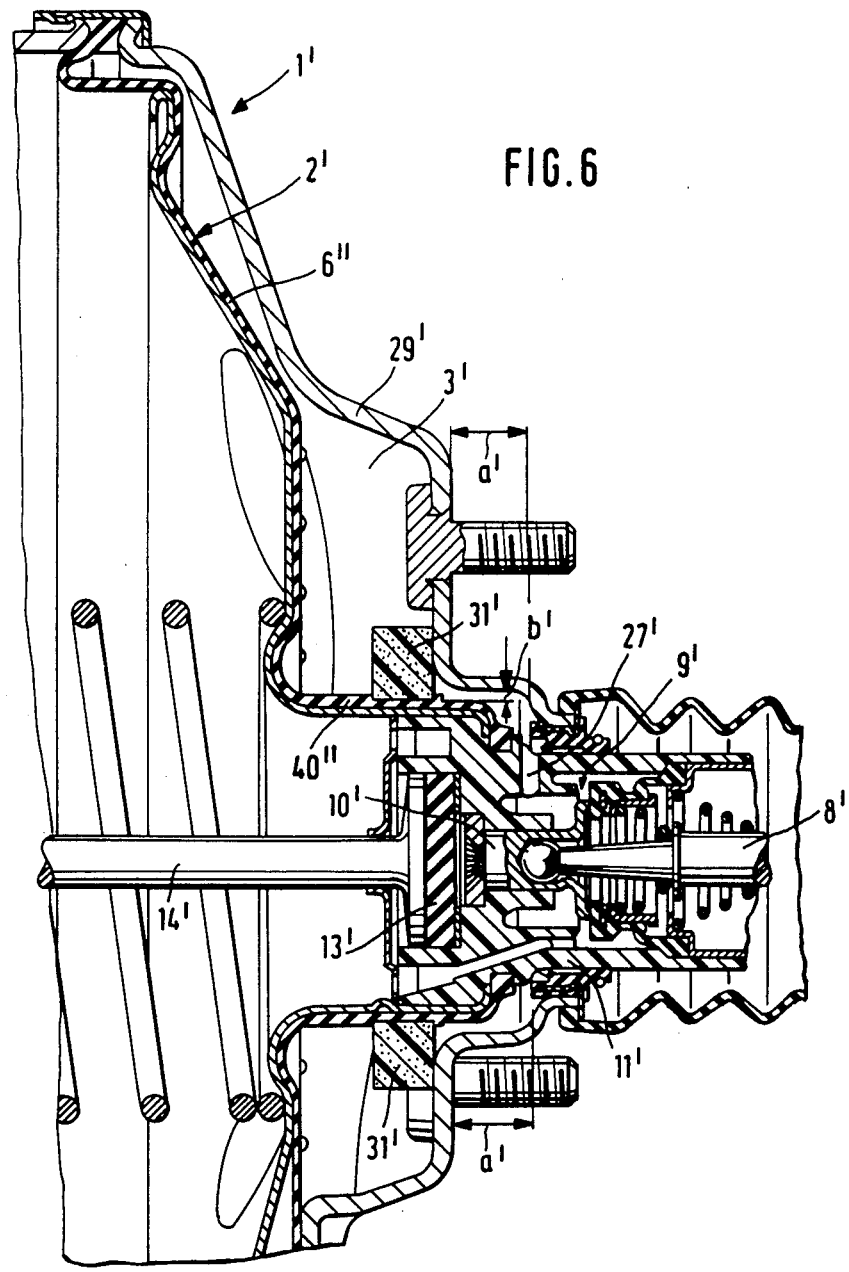
FIG. 6 is a longitudinal partial cross-section through another embodiment of a brake power booster in which the air deflector element in the shape of a hollow cylinder-type expanded plastic ring is arranged in the radially internal portion of the power chamber in the range of the mouth of the annular clearance.

The embodiment of FIG. 6 provides a brake power booster in which in the range of the annular clearance b', an expanded plastic ring 31' is arranged on the cylindrical portion of the diaphragm 6" extending in the direction of the brake pedal. The air flowing through the duct 27' into the annular clearance b' during brake operation encounters the expanded plastic ring 31' which is cemented or vulcanized to the collar 40" of the diaphragm 6" and is slowed down during its flow through the expanded plastic ring 31', with the inflowing air being uniformly distributed in this manner, so that no noises can arise.

The embodiment of FIGS. 7 to 9 is distinguished from those described in the foregoing in that the expanded plastic ring 31" slows down the flow of air, while uniformly distributing the air and damping potential vibrations. Ring 31" is arranged in the range of transition from the radially extending duct 27" to the annular clearance b" and is retained on the control valve body 11" by means of a clamping ring 35. As is evident from FIGS. 8 and 9, the clamping ring 35 presents a plurality of tabs 36 distributed over its circumference. Ring 35 includes tabs 36 which clamp on the cylindrical outer surface of the control valve body 11". The expanded plastic ring 31" is slipped onto the cylindrical flanged elements 37 and is pressed to the sealing torus 38 of the diaphragm 6''' by means of the clamping ring 35.

FIG. 10 shows a cross section through an embodiment of an air deflector element 41 in the shape of a hollow cylinder type ring of a prous ceramic material. Element 41 includes internal circular groove 42.

What is claimed is:

1. A vacuum-operated brake power booster with a movable wall sealed off relative to the vacuum housing and with a piston rod coupled with a brake pedal and serving to actuate a control valve by means of which a power chamber of the brake power booster is connectible at option either to vacuum or to a more elevated differential pressure, said control valve being furnished with a control valve piston adapted to slide axially within a control valve body, said control valve piston acting on the end of a push-rod sliding the piston of the master cylinder, a reaction element interposed between said control valve piston and said push-rod, and an air deflector element in the annular clearance formed between a peripheral surface of said control valve body and a neck portion of said vacuum housing to affect the flow of air in said annular clearance, said air deflector element retained to said control valve body in a manner such that said air deflector element moves jointly with said movable wall in the longitudinal direction of the vacuum-operated brake power booster.

2. The vacuum-operated brake power booster of claim 1 further including a clamping ring surrounding said control valve body to secure said air deflector element.

3. The vacuum-operated brake power booster of claim 2, wherein said clamping ring is furnished with a plurality of ribs on its radially inward annular surface, said ribs extending radially inwardly and serving to anchor said clamping ring on the outer surface of said control valve body, said clamping ring being provided at its end facing the brake pedal with a radially outwardly extending flange to prevent said air deflector element which is slipped over said clamping ring from shifting in an axial direction.

4. The vacuum-operated brake power booster of claim 1 wherein said air deflector element is formed from ceramic material, and is substantially ring-shaped and furnished with at least one circular groove in its cylindrical inner surface.

5. The vacuum operated power brake booster of claim 1 wherein a flange portion encircles and is affixed to the peripheral surface of said control valve body in the area of said annular clearance, said air deflector element retained on said flange, whereby said air deflector element moves jointly with said moveable wall in the longitudinal direction of the vacuum operated brake power booster.

6. The vacuum operated power brake booster of claim 1 wherein a diaphragm surrounds and is affixed to the peripheral surface of said control valve body in the area of said annular clearance, said air deflector element is retained on said diaphragm, whereby said air deflector element moves jointly with said moveable wall in the longitudinal direction of the vacuum operated brake power booster.

7. The vacuum-operated brake power booster of claim 6, wherein said diaphragm seals off a dished diaphragm retainer of said movable wall and is provided with a collar sealingly surrounding and affixed to said control valve body in the area of said annular clearance, said collar having a plurality of nubs at its radially external envelope said nubs extend substantially through said annular clearance approximately to a radially inside wall surface of a neck portion of said vacuum housing said nubs defining said air deflector element.

8. The vacuum-operated brake power booster of claim 6 wherein a radially outwardly extending circular disc-shaped sector of said diaphragm seals off a dished diaphragm retainer and is furnished with a plurality of ribs extending generally radially outwardly and uniformly distributed over the circumference of said disc shaped sector of said diaphragm said ribs in conjunction with an inside wall of said vacuum housing define a plurality of radial ducts that permit air to flow from said annular clearance into said power chamber through said ducts.

9. The vacuum-operated brake power booster of claim 6 wherein said diaphragm seals off a dished diaphragm retainer of said movable wall and is furnished with a collar sealingly surrounding said control valve body in the area of said annular clearance and including a plurality of scattered, radially extending nubs onto which said air deflector element is secured.

* * * * *